(12) United States Patent
Ebert

(10) Patent No.: US 11,254,163 B2
(45) Date of Patent: Feb. 22, 2022

(54) VEHICLE RIGID AXLE AND METHOD OF MANUFACTURING SAME

(71) Applicant: Ebert-Consulting GmbH, Cologne (DE)

(72) Inventor: Jorg Ebert, Cologne (DE)

(73) Assignee: Ebert-Consulting GMBH, Cologne (DE)

( * ) Notice: Subject to any disclaimer, the term of this patent is extended or adjusted under 35 U.S.C. 154(b) by 87 days.

(21) Appl. No.: 16/779,619

(22) Filed: Feb. 2, 2020

(65) Prior Publication Data
US 2020/0247184 A1 Aug. 6, 2020

(30) Foreign Application Priority Data

Feb. 6, 2019 (DE) .......................... 102019201518.2

(51) Int. Cl.
*B60B 35/00* (2006.01)
*B60G 9/00* (2006.01)
*B60G 11/28* (2006.01)

(52) U.S. Cl.
CPC ............ *B60B 35/007* (2013.01); *B60G 9/003* (2013.01); *B60G 11/28* (2013.01); *B60B 2310/302* (2013.01); *B60B 2360/141* (2013.01); *B60G 2200/31* (2013.01); *B60G 2202/152* (2013.01); *B60G 2204/126* (2013.01);
(Continued)

(58) Field of Classification Search
CPC .... B60G 9/003; B60G 11/28; B60G 2200/31; B60G 2206/424; B60G 2206/30; B60G 2204/4306; B60G 2204/148; B60B 35/007
See application file for complete search history.

(56) References Cited

U.S. PATENT DOCUMENTS 2,204,287 A * 6/1940 Wilber ................... B60B 35/16
74/607
3,015,238 A * 1/1962 Williams ................ B60B 35/16
74/607
(Continued)

FOREIGN PATENT DOCUMENTS

DE 10140856 3/2003
DE 10206017 9/2003
(Continued)

*Primary Examiner* — Faye M Fleming
(74) *Attorney, Agent, or Firm* — Fattibene and Fattibene LLC; Paul A. Fattibene

(57) ABSTRACT

A vehicle rigid axle with an axle beam, at the ends of which axle journals or wheel carriers, are arranged, and trailing arms rigidly attached with a spring bracket for supporting an air-suspension bellow, and a method for manufacturing the vehicle rigid axle. An axle beam section extending between the trailing arms, a trailing arm adjoining the axle beam section and the spring bracket are formed by two shell elements connected to each other, which form a hollow body. In an embodiment, the spring bracket is formed by a lower shell element forming an axle beam section extending between the two trailing arms, and the spring bracket is arranged so that the air-suspension bellow mounted on the spring bracket is penetrated by the central longitudinal axis of the axle beam section. Two shell elements made of sheet metal are formed and joined together to form a hollow body.

15 Claims, 6 Drawing Sheets

(52) U.S. Cl.
CPC .............. *B60G 2204/148* (2013.01); *B60G 2204/4306* (2013.01); *B60G 2206/30* (2013.01); *B60G 2206/424* (2013.01)

(56) References Cited

U.S. PATENT DOCUMENTS

| | | | | |
|---|---|---|---|---|
| 6,749,209 | B2* | 6/2004 | Davison | B60B 35/08 |
| | | | | 280/124.109 |
| 7,025,428 | B2* | 4/2006 | Gabella | B60G 9/02 |
| | | | | 267/52 |
| 7,370,872 | B2* | 5/2008 | Abrat | B60B 35/04 |
| | | | | 280/124.116 |
| 10,562,349 | B2* | 2/2020 | Nagel | B60G 7/008 |
| 2004/0188972 | A1 | 9/2004 | Abrat et al. | 280/124.128 |
| 2007/0199763 | A1* | 8/2007 | Henze | B60G 9/00 |
| | | | | 180/378 |

FOREIGN PATENT DOCUMENTS

| | | | | |
|---|---|---|---|---|
| DE | 10231337 | | 3/2004 | |
| JP | 2001287525 | A * | 10/2001 | ........... B60G 21/055 |
| JP | 2015020670 | A * | 2/2015 | ............. B60G 7/008 |

\* cited by examiner

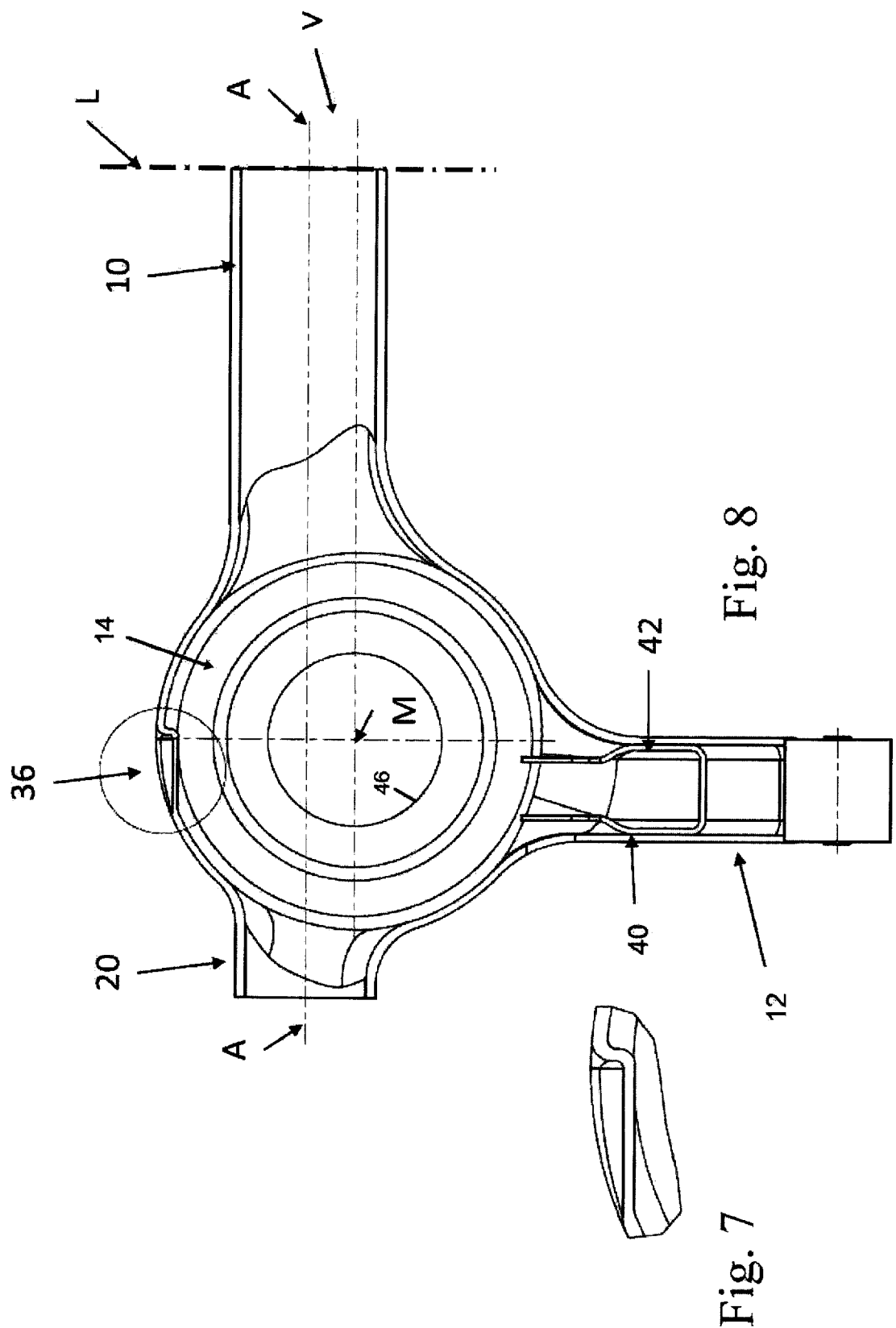

VEHICLE RIGID AXLE AND METHOD OF MANUFACTURING SAME

FIELD OF THE INVENTION

The present invention refers to a vehicle rigid axle with an axle beam and trailing arms. Such a vehicle rigid axle is known from DE 101 40 856 B4 and DE 102 31 337 B3 respectively.

BACKGROUND OF THE INVENTION

In the case of the aforementioned vehicle rigid axle, a tubular axle beam extending transversely to the direction of the vehicle is welded to an axle guide formed by a shell-shaped hollow body which is welded at one end to a bearing sleeve and at its other end forms annular connecting surfaces for connecting the axle beam on the one hand and an axle journal on the other hand, which are each connected by welding to the hollow body forming the axle guide. This axle guide also has connecting surfaces for a spring bracket. The spring bracket consists of an upper and a lower sheet-metal belt and a web provided between them and fixed by welding with the belts. This spring bracket is welded to the axle guide. The spring bracket essentially extends in extension of the axle guide. In relation to the axle beam, a bearing sleeve is therefore provided on one side relative to its longitudinal axis to support the trailing arm at one end and the spring bracket on which an air-suspension bellow is supported on the other side.

The production of the previously known vehicle rigid axle is complex. It requires a large number of forming and joining steps. In addition, a lever arm is created between the longitudinal axis of the axle beam and the spring bracket, which causes the resulting wheel vertical forces to be split into an axle support by the annular connecting surface and a spring bracket and an air spring. This splitting causes a corresponding unfavorable unsprung introduction of the chassis forces.

SUMMARY OF THE INVENTION

The present invention is based on the object of providing a vehicle rigid axle of the type mentioned above which avoids the aforementioned disadvantages in whole or in part.

To solve this problem, the present invention proposes a vehicle rigid axle with the features of different embodiments.

According to the first aspect of the apparatus-related solution, the vehicle rigid axle has a hollow body formed by two shell elements connected to each other. These shell elements are usually formed by forming a sheet, preferably by deep drawing. The hollow body and, accordingly, the two shell elements alone form an axle beam section, an adjoining trailing arm and the spring bracket assigned to the trailing arm. The axle beam section can only make up half of the entire axle beam. Thus, two of the above-mentioned hollow bodies can in themselves form the essential structural component of the vehicle rigid axle when their axle beam sections are welded together. Alternatively, a uniform axle beam can be formed by the two shell elements, which then form at least two longitudinal beams and the spring brackets assigned to these longitudinal beams in one piece. In this way, a vehicle rigid axle is created which, in addition to the hollow body and certain attachments welded to it, which will be discussed in more detail below, only needs to be welded at the ends with axle journals in order to form an axle element suitable for installation on a truck chassis. It goes without saying that this axle element should be equipped with the usual functional parts, namely an air-suspension bellow, a shock absorber and the components of the end pivot bearing for the trailing arm.

In any case, the vehicle rigid axle according to the invention can be manufactured with fewer components than before. The formation of the hollow body from two shell elements, preferably formed by forming, also reduces the number of weld seams and thus causes mechanical weakening of the rigid axle. The welds are preferably provided in the neutral fiber of the vehicle rigid axle of the vehicle subjected to bending stress, which further reduces the risk of excessive weakening of the hollow body due to the welds.

Furthermore, the hollow body offers the possibility of arranging the spring bracket inside the hollow body. The arrangement is such that the air-suspension bellow mounted on the spring bracket is penetrated by the central longitudinal axis of the axle beam. This assembly prevents significant bending moments being introduced via an air-suspension bellow that is supported too much at the sides, which further increases the load on the vehicle rigid axle and can lead to undesirable vibrations. It is not necessary for the hollow body to form the trailing arm, the spring bracket and the axle beam section. Rather, according to the invention, the spring bracket is formed by a lower shell element of a hollow body, which forms an axle beam section extending between the two trailing arms. The corresponding axle beam section need not form half or all of the length of the axle beam of a vehicle rigid axle between the opposed trailing arms. Rather, the axle beam section can also be formed solely by those areas at the level of the trailing arm.

The axle beam section may be welded to a separate tubular axle beam. Various designs of the hollow body are conceivable. The hollow body alone can thus form the spring bracket and the trailing arm and—as known from the previously mentioned state of the art—can form respective tubular connecting areas for connecting a tubular axle beam and an axle journal. Preferably, however, the hollow body is designed with the features of two shell elements which are connected to one another to form a hollow body.

The hollow body of the two alternatively proposed solutions should preferably form an axle journal connection section opposite the axle beam in relation to the axle guide, which is connected to the axle journal or the wheel carrier. This axle journal section is usually formed by the two shell elements and regularly has a cross-sectional geometry corresponding to the cross-sectional geometry of the axle journal. The axle journal connection section is preferably formed with an annular cross-section.

In order to further reduce the number of elements required for the manufacture of the vehicle rigid axle, it is proposed, in accordance with a preferred further development of the present invention, to form the lower shell element with a plunger to which the air-suspension bellow is connected. Such a plunger is described for example in DE 102 06 017 A1. It serves to guide and hold the air-suspension bellow and is usually cylindrical in shape. The plunger is preferably a component of the lower shell element and is formed in one piece with it when the shell element is formed from a flat sheet metal. Then, the plunger is a segment of the uniform shell element formed by bending.

Preferably, the plunger consists of a segment which is firmly joined to the lower shell element and another plunger segment which is cut out of the identically shaped shell element which later forms the upper shell element. This enables economical manufacture, since both shell elements, which form the hollow body, are first formed by identical forming operations and are only individualized by cutting them out to form lower and upper shell elements. Furthermore, the material used is used in the best possible way. An air spring receiving opening leading to the spring bracket inside the hollow body is formed on the upper shell element by cutting out the plunger segment. The plunger is located opposite this air spring receiving opening and its height has basically been doubled by joining the two plunger segments.

With regard to a cost-effective and relatively weight-saving design without loss of strength, it is proposed, in accordance with a preferred further development of the present invention, to form the lower and/or the upper shell element from a sheet with varying wall thickness. Such a sheet can be prepared by rolling or by joining sheet segments of different thicknesses. The sheet metal segments are usually joined by welding them together. The sheet blank prepared in this way is only formed and welded. If necessary, segments are cut out of the shell elements produced in this way, for example to provide an immersion opening for a damper element on the hollow body. Otherwise, only a welding process is carried out to form the hollow body from the two shell elements, if necessary to join another bearing element formed by a bent sheet metal and/or the bearing sleeve of a joint bearing formed in a standard way with the hollow body.

The aforementioned bearing element for bearing the damper element preferably has a bearing for the articulated bearing of the damper element, which is provided at the level of the neutral fiber. This also simplifies the load case of the vehicle rigid axle during operation.

Accordingly, the present invention provides a significantly simplified vehicle rigid axle, the loading of which can be further simplified by introducing the supporting forces of the air-suspension bellow approximately at the level of the central longitudinal axis of the axle beam. It goes without saying that the vehicle rigid axle is designed in the usual way, i.e. the axle beam forms a spring bracket with associated air-suspension bellow and a trailing arm at its opposite end. The structural components of this unit may consist of one or two hollow bodies welded together, usually identical or at least symmetrically shaped. Only the axle journals, which are usually lathed for mounting a rolling bearing, must be welded to this hollow body. However, the hollow body or both hollow bodies are regularly not lathed. The functional surfaces result solely from the design of the semi-finished product used (sheet metal) or forming of sheet metal. The sheet can be punched or recessed by other processes, such as flame cutting. The hollow body is usually not machined.

BRIEF DESCRIPTION OF THE DRAWINGS

Further advantages and details of the present invention result from the following description of an embodiment in connection with the drawing:

FIG. 7 shows the detail of an indentation encircled in FIG. 8 in enlarged view, and FIG. 8 shows a top view of the lower shell element according to FIG. 2 or FIG. 4.

DETAILED DESCRIPTION OF THE INVENTION

Figure 1:
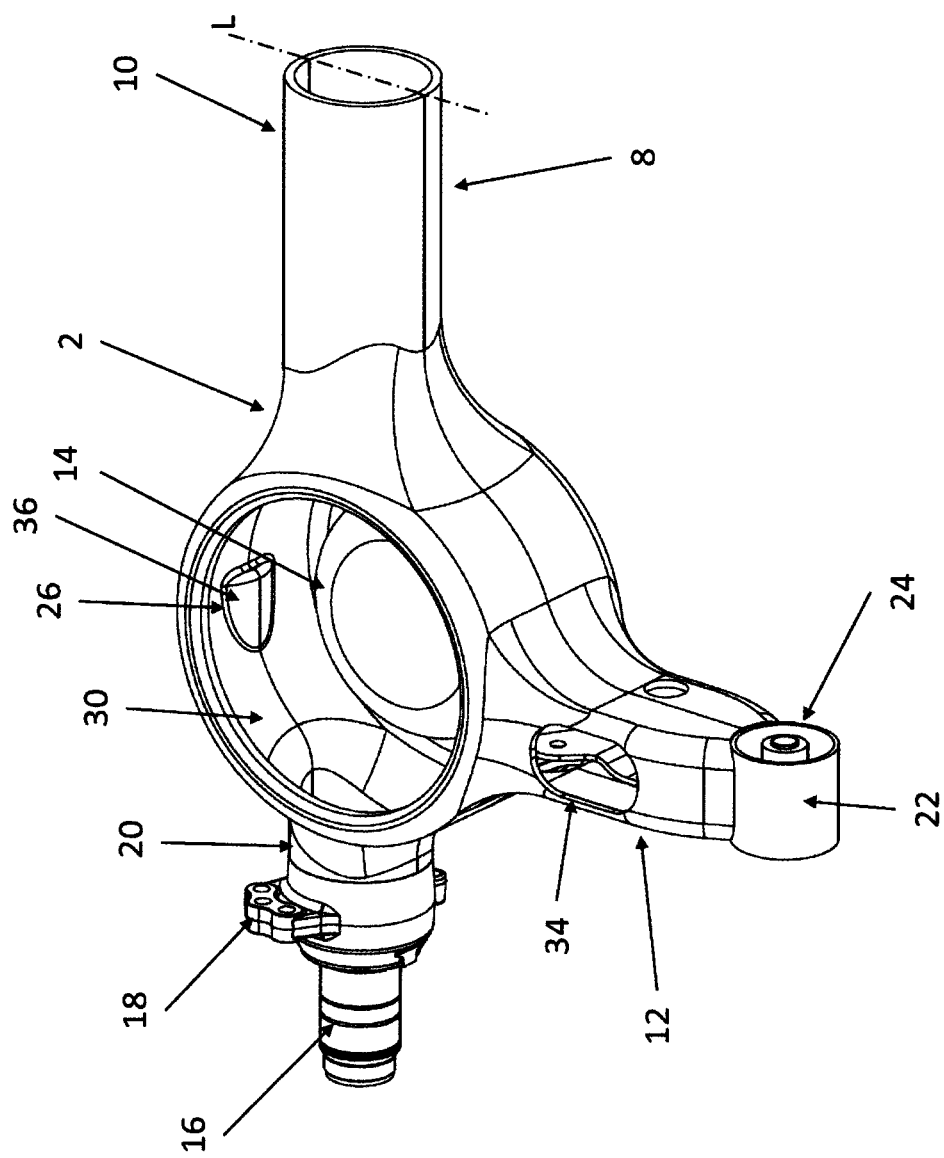
FIG. 1 shows a perspective side view of an embodiment of a vehicle rigid axle of the present invention.

The Figures show an axle beam marked with reference numeral 2, formed by joining a lower shell element 4 and an upper shell element 6. The two shell elements 4, 6 are joined together by welding to form the axle beam 2. The connecting line usually extends in the neutral fiber of a bending load on the axle beam 2.

The two shell elements 4, 6 together form an axle beam section 10, a trailing arm 12 and a spring bracket 14. FIG. 1 shows only half of the complete vehicle rigid axle 8. The distal end of the axle beam section 10 lies on the central longitudinal axis of the vehicle, regularly of a truck trailer. Thus, on the other side of the longitudinal axis marked L, the structure shown to the left of it in FIG. 1 is repeated.

On the side opposite the spring bracket 14 in relation to the axle beam section 10, an axle journal 16 is welded on, which is fitted with a conventionally shaped brake mounting flange 18. The axle journal 16 is connected by friction welding to an axle journal connection section 20, which is formed half by the lower and half by the upper shell element 4, 6.

A bearing sleeve 22 is welded to the distal end of the trailing arm 12, which accommodates further components of a normally designed joint bearing 24.

Figure 2:
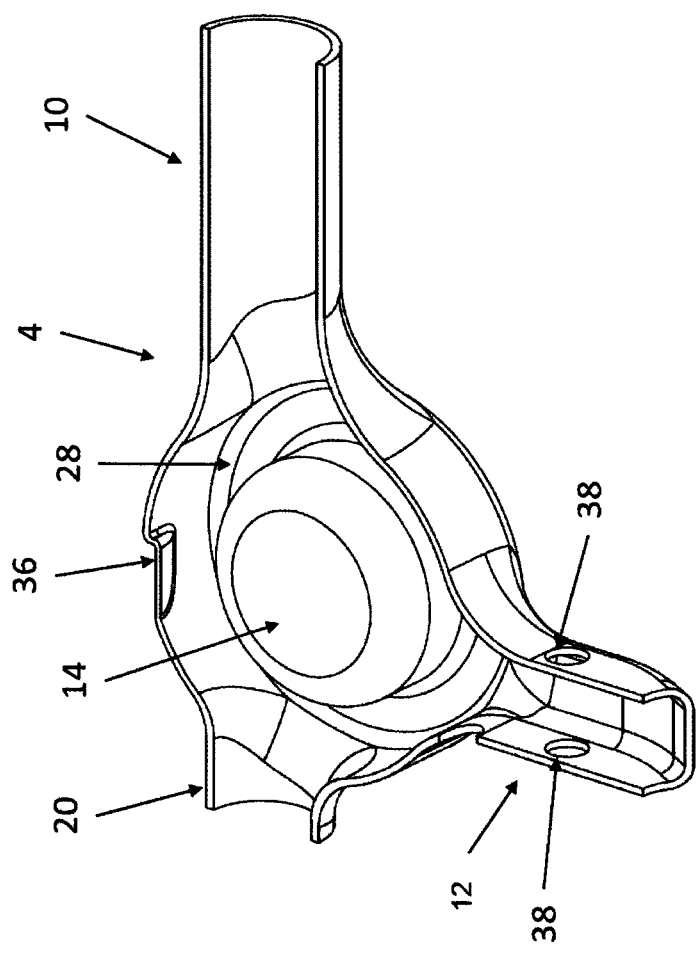
FIG. 2 shows a perspective top view of the lower shell element of the rigid axle according to FIG. 1.
Figure 3:
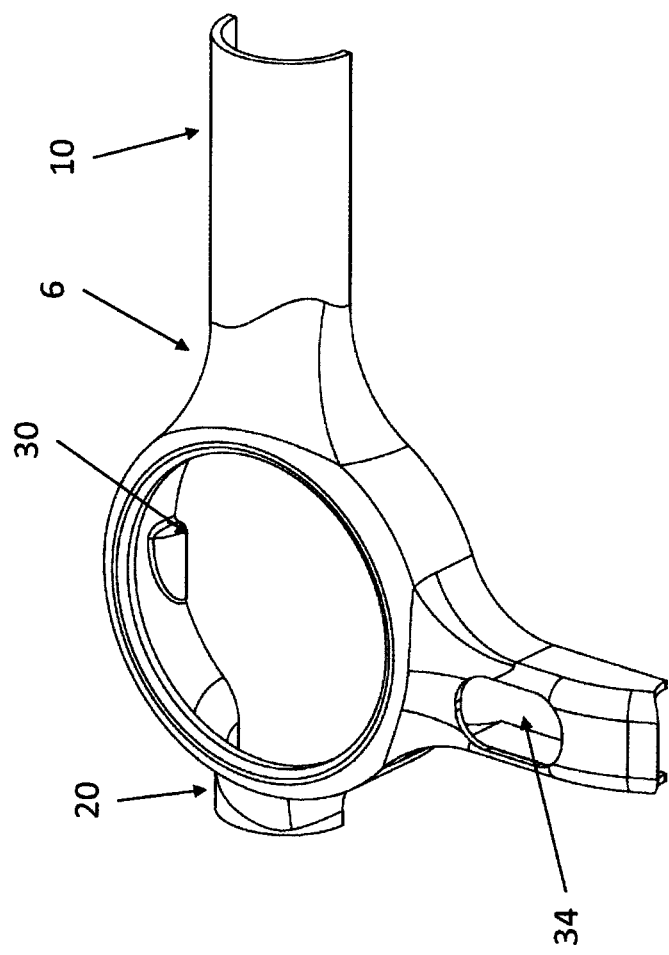
FIG. 3 shows a perspective top view of the upper shell element of the rigid axle according to FIG. 1.

As FIGS. 2 and 3 in particular illustrate, the axle beam 2 forms a hollow body marked with reference numeral 26 between the joined shell elements 4, 6, so that axle beam section 10 and axle journal connection section 20 end as hollow tubes with a circular cross-section. The trailing arm 12 is also welded to the bearing sleeve 22 as a hollow body which tapers conically at the end.

The deep-drawn shell elements 4 and 6 shown in FIGS. 2 and 3 can either form half the axle beam with only one trailing arm 12 and a spring bracket 14 and an axle journal connection section 20. Corresponding shell elements 4, 6 can, however, also be symmetrically shaped with respect to the longitudinal axis L and accordingly form an axle journal connection section 20, a trailing arm 12 adjacent to it and a spring bracket 14 assigned to the trailing arm 12.

In this way, an axle beam 2 can be produced simply and economically by deep-drawing and some finishing steps explained in more detail below. The starting materials used for the manufacture of the lower and upper shell elements, i.e. the sheets to be deep-drawn, have varying wall thicknesses in order to correspond to the different stresses on axle beam 2. The trailing arm 12, for example, is regularly made of a thinner sheet material than the axle beam section 10 or the axle journal connection section 20. The different sheet thicknesses can be prepared, for example, by contour rolling (TRB—Tailor Rolled Blank) or by welding sheets with different wall thicknesses. The trailing arm 12 has a wall thickness of between 2 and 4 mm less than the wall thickness of sections 10 and 20. For example, the sheet material forming the trailing arm 12 may have a thickness of 8 mm, whereas sections 10, 20 are formed with a wall thickness of about 10 mm.

As a comparison of FIGS. 2 and 3 immediately illustrates, the upper shell element 6, identical to the lower shell element 4, is initially formed by forming, whereby a base of the lower shell element 4, marked with reference numeral 28 in FIG. 2, has been cut out to form a central air spring receiving opening 30 provided on the upper shell element 6. In the embodiment shown, the lower shell element 4 has a cylindrical plunger 32, whose function and interaction with an air-suspension bellow, not shown in detail, follows a conventional design. In this respect, reference can be made to DE 102 06 017 A1, for example. The plunger 32 in the present case is formed by deep drawing alone. However, it is also possible to form identically shaped plunger sections during deep drawing of the two shell elements 4, 6 and to connect the plunger section obtained by cutting the base of the upper shell element 6 with the plunger section associated with the lower shell element 4 in order to obtain a plunger with the desired axial height. In this way, the material used for the production of the shell elements 4, 6 can be used in the best possible way. It is also possible to manufacture plungers with a sufficient axial height without the need for a considerable formation of the height by deep drawing, which has a positive effect on the service life of the deep drawing tool.

In the case of the upper shell element 6 shown in FIG. 3, not only the base 28 was cut out. Rather, an immersion opening 34 was also cut into an upper boundary surface of the trailing arm 12, in which a damper element, not shown, engages, which interacts in a manner known per se with a bearing rim attached to the vehicle or a stem attached to it, as is generally known in the state of the art. Thus, the further processing steps after deep drawing of the lower shell element are described in detail. FIGS. 1 and 7 show another indentation 36, half of which is formed by each of the shell elements 4, 6 opposite the trailing arm 12. This indentation 36 can be formed during the deep drawing of the two shell elements 4, 6 and accommodates an outer circumferential section of a movable brake cylinder of a floating caliper brake when it moves away from the brake disc due to brake wear.

Figure 4:
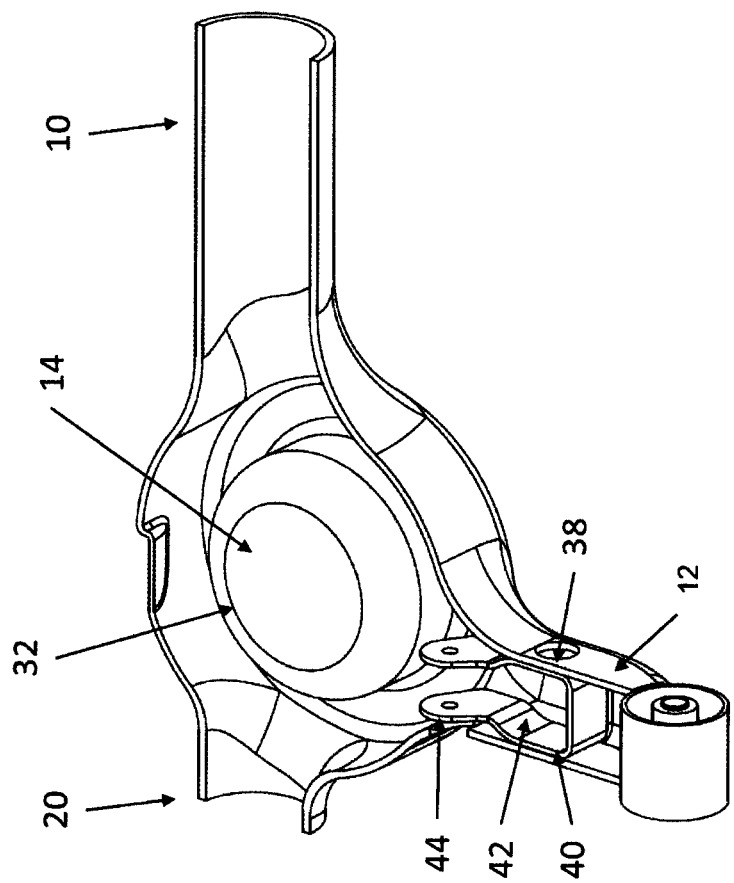
FIG. 4 shows a perspective view of the lower shell element as shown in FIG. 2 after welding on further components of the vehicle rigid axle.
Figure 5:
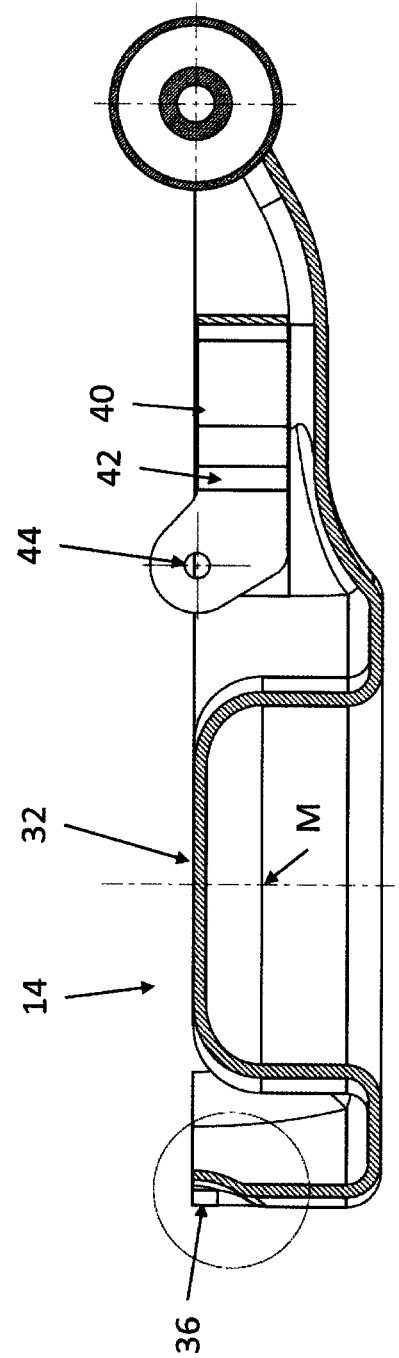
FIG. 5 shows a cross-sectional view of the lower shell element in the longitudinal direction of the trailing arm.
Figure 6:
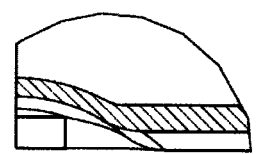
FIG. 6 shows the detail of an indentation encircled in FIG. 5 in enlarged view.

As can be seen in FIG. 2, the lower shell element is provided with opposite fixing bores 38 on opposite side walls forming the trailing arm 12, which are used to fix a bearing element provided with reference numeral 40 in FIG. 4. The bearing element 40 is substantially U-shaped, the free ends of opposite legs 42 of the bearing element 40 extending substantially parallel to the side walls of the trailing arm 12, but offset inwardly relative to the inner surfaces of these side walls and provided with bearing bores 44 to receive a non-displayed damper element, the other end of which is connected to the vehicle-side bearing block or the stem therefor. As FIG. 5 illustrates, this bearing bore 44 is located in the joining plane of the two shell elements 4, 6. The bearing element 40 is manufactured as a bent piece of sheet metal and is connected to the lower shell element 4 by circular welding along the inner circumferential surface of the fixing bore 38 before the upper shell element 6 is placed on the lower shell element 4 and thus welded. The mounting of the damper element on the bearing element 40 is done through the air spring receiving opening 30.

FIG. 8 illustrates geometric details of the lower shell element 4 The center point of plunger 32, marked M, is offset in relation to the central longitudinal axis A of axle beam 2 in the direction of travel and accordingly in the direction of trailing arm 12. In the present case the offset V is about 50 mm. However, as can be seen in the plan view according to FIG. 8, the central longitudinal axis A of the axle beam 2 intersects the raised contact area of the plunger 32. Thus the central longitudinal axis A of the axle beam section 10 passes through an air-suspension bellow 46 mounted on the spring bracket 14. The design of the spring bracket 14 inside the hollow body 26 enables this design, which results in lower unsprung masses. Whereas in the state of the art according to DE 101 40 856 B4, for example, the air-suspension bellow are arranged at a considerable distance from the central longitudinal axis of the axle beam and therefore the spring bracket supporting the air-suspension bellow also acts as a bending spring between the central longitudinal axis and the point of force application of the air-suspension bellow, in the present invention the air-suspension bellow lies approximately on the central longitudinal axis A. The support by the bellows is accordingly at approximately the same level as the axle beam 2 and thus the axial load on the latter.

FIG. 8 also shows the rotationally symmetrical cross-section of the fully formed axle beam section 10 and the axle journal connection section 20. These two sections are provided coaxially to each other and preferably have a circular cross-section. The diameters of both sections 10, 20 correspond to each other. Provided that the lower and upper shell elements 4, 6 form only the "half" of the vehicle rigid axle shown in the Figures, these two halves can be welded together in the area of the longitudinal axis L, for example by friction welding.

LIST OF REFERENCE NUMERALS 2 axle beam
4 lower shell element
6 upper shell element
8 vehicle rigid axle
10 axle beam section
12 trailing arm
14 spring bracket
16 axle journal pin
18 brake mounting flange
20 axle journal connection section
22 bearing sleeve
24 joint bearing
26 hollow body
28 base
30 air spring receiving opening
32 plunger
34 immersion opening
36 indentation
38 fixing hole
40 bearing element
42 legs
44 bearing bore
46 air-suspension bellow
A central longitudinal axis
L longitudinal axis
M center of the plunger 32
V offset

What is claimed is:
1. Vehicle rigid axle with an axle beam, at the ends of which axle journals and wheel carriers, respectively, are arranged, and with at least two trailing arms rigidly attached to the axle beam and with at least one spring bracket assigned to the respective trailing arm for supporting an air-suspension bellow, comprising:
    at least one axle beam section extending between the at least two trailing arms, a trailing arm adjoining the at least one axle beam section and the spring bracket assigned to the trailing arm are formed by two shell elements which are connected to one another and form a hollow body between them; and wherein the at least one spring bracket is formed by a lower shell element of a hollow body forming the at least one axle beam section extending between the at least two trailing arms, and the at least one spring bracket is arranged in such a way that a central longitudinal axis of the at least one axle beam section passes through the air-suspension bellow mounted on the at least one spring bracket.

2. Vehicle rigid axle according to claim 1, wherein:
the hollow body is formed by a lower shell element and an upper shell element which are welded together at a level of a neutral fiber of the vehicle rigid axle subjected to bending stress.

3. Vehicle rigid axle according to claim 2, wherein:
the lower shell element and the upper shell element form the hollow body which forms an axle beam extending between the two trailing arms, at least two trailing arms and the spring brackets associated with them.

4. Vehicle rigid axle according to claim 3, wherein:
the hollow body forms an axle journal connection section opposite the axle beam with respect to the trailing arm, which is connected to the axle journal or the wheel carrier.

5. Vehicle rigid axle according to claim 3, wherein:
the lower shell element forms a plunger cooperating with the air-suspension bellow, to which the air-suspension bellow is connected.

6. Vehicle rigid axle with an axle beam, at the ends of which axle journals and wheel carriers, respectively, are arranged, and with at least two trailing arms rigidly attached to the axle beam and with at least one spring bracket assigned to the respective trailing arm for supporting an air-suspension bellow, comprising:
at least one axle beam section extending between the at least two trailing arms, a trailing arm adjoining the at least one axle beam section and the spring bracket assigned to the trailing arm are formed by two shell elements which are connected to one another and form a hollow body between them; and
wherein the lower and the upper shell elements are first manufactured as identical parts by means of deep drawing and that after deep drawing a plunger cooperating with the air-suspension bellow is formed on the lower shell element.

7. Vehicle rigid axle according to claim 6, wherein:
the lower and the upper shell elements are formed of a sheet metal with varying wall thickness.

8. Vehicle rigid axle according to claim 7, wherein:
the trailing arm has a smaller wall thickness than the axle beam and/or an axle journal connection section opposite the axle beam with respect to the trailing arm.

9. Vehicle rigid axle according to claim 1, wherein:
the hollow body has an insertion opening for a damper element.

10. Vehicle rigid axle according to claim 9, further comprising:
a bearing provided at the level of a neutral fiber for articulated mounting of the damper element.

11. A vehicle rigid axle according to claim 10, further comprising:
a bearing element formed from bent sheet metal and connected to the lower shell element for the articulated mounting of the damper element.

12. Vehicle rigid axle comprising:
an axle beam, at the ends of which axle journals and wheel carriers, respectively, are arranged, and with at least two trailing arms rigidly attached to the axle beam, and with at least one spring bracket, assigned to a respective trailing arm, for supporting an air-suspension bellow, wherein the at least one spring bracket is formed by a lower shell element of a hollow body forming at least one axle beam section extending between the at least two trailing arms, and the at least one spring bracket is arranged in such a way that a central longitudinal axis of the axle beam section passes through the air-suspension bellow mounted on the spring bracket.

13. Vehicle rigid axle according to claim 12, further wherein:
the at least one axle beam section extending between the at least two trailing arms, a trailing arm adjoining the at least one axle beam section and the spring bracket assigned to the trailing arm are formed by two shell elements which are connected to one another and form a hollow body between them.

14. Vehicle rigid axle according to claim 12, wherein:
the hollow body is formed by a lower shell element and an upper shell element which are welded together at a level of a neutral fiber of the vehicle rigid axle subjected to bending stress.

15. A vehicle rigid axle comprising;
a lower shell element having a spring bracket, a first portion of an axle beam with a central longitudinal axis, a first portion of a trailing arm, and a first portion of an axle journal connection section formed therein;
a plunger having a center placed in the spring bracket;
an upper shell element having an air spring receiving opening, a second portion of an axle beam, a second portion of a trailing arm, and a second portion of an axle journal connection section formed therein;
a weld attaching said lower shell element to said upper shell element, whereby a hollow body is formed configured to receive an air-suspension bellow; and
wherein the center of said plunger is offset in relation to the central longitudinal axis of the first portion of the axle beam.

* * * * *